E. A. HALBLEIB.
ELECTRIC MOTOR OR GENERATOR.
APPLICATION FILED JUNE 14, 1915.
1,202,841.
Patented Oct. 31, 1916.
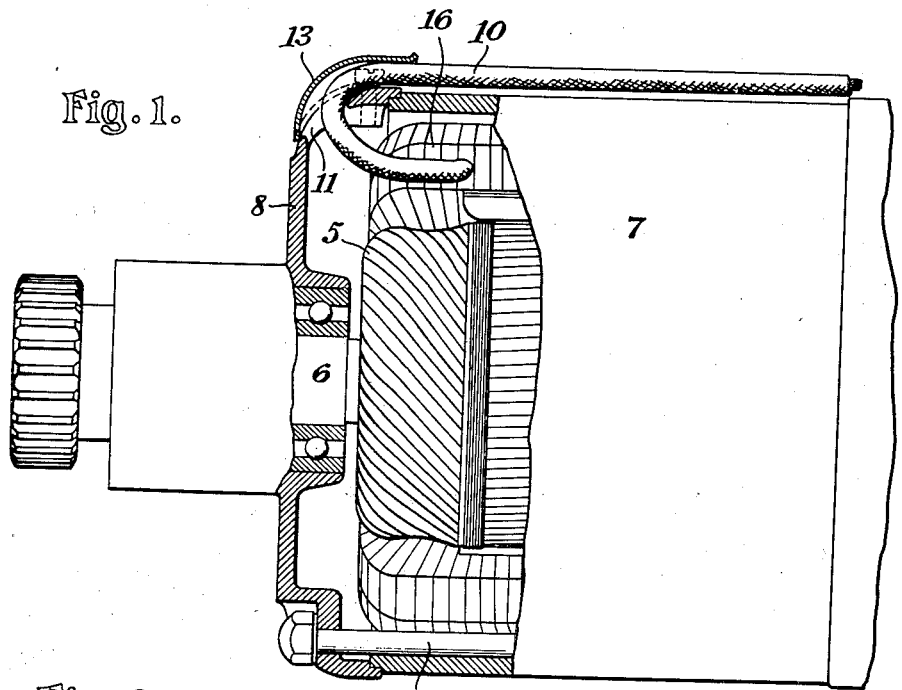
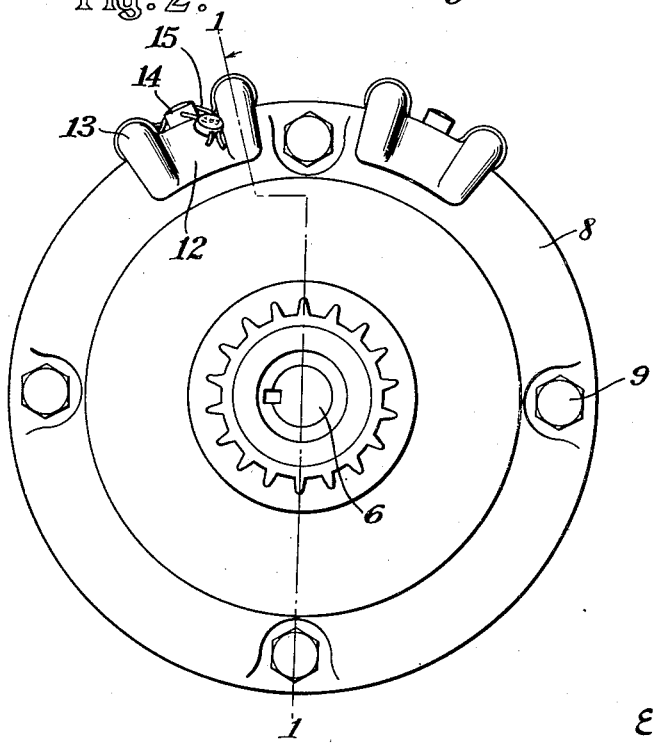
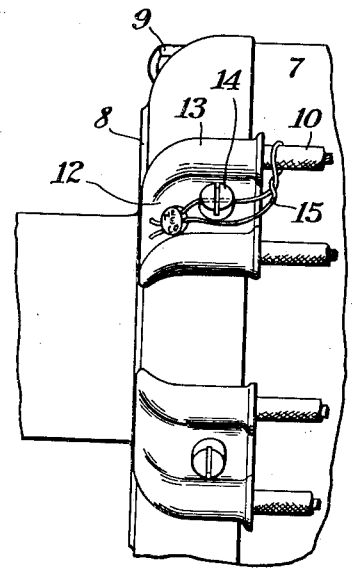
Inventor:
Edward A. Halbleib
by his attorneys
Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC MOTOR OR GENERATOR.

1,202,841.  Specification of Letters Patent.  Patented Oct. 31, 1916.

Application filed June 14, 1915. Serial No. 33,992.

*To all whom it may concern:*

Be it known that I, EDWARD A. HALBLEIB, a citizen of the United States, and resident of Rochester, in the county of Monroe and State of New York, have invented certain new and useful Improvements in Electric Motors or Generators, of which the following is a specification.

This invention relates to electric motors or generators of the inclosed type.

One object of the invention is to provide, in a simple and convenient manner, for the protection of the current-leads by which connection is made with the windings of the motor or generator, at the point where they emerge from the casing of the machine, and for shielding the opening or openings through which they emerge against the admission of water, dirt, etc. To this end I employ an arrangement in which the leads emerge through openings at one end of the casing, and are then bent reversely so as to extend toward the opposite end of the casing, the leads at their point of emergence being covered by cap-like shields which are rigidly but removably secured to the casing, and which are so formed as both to shield the openings, and to protect the leads and hold them bent as described.

Another object of the invention is to provide simple and convenient means for sealing the casing of the motor or generator, to prevent the user from opening the casing and tampering with the interior parts of the machine. To this end I utilize the screws, or other fastening-means, by which one of the shields above referred to is secured to the casing, so that this shield may be sealed in place. So long as it remains so sealed it is impossible to open the end of the casing through which the leads are passed, by reason of the fact that the reverse bending of the leads prevents them from being withdrawn so long as the shield is in place.

In the accompanying drawings:—Figure 1 is a side-elevation of a portion of an electric motor or generator embodying the present invention, shown partly in vertical section; Fig. 2 is an end-view, looking from right to left in Fig. 1, and indicating the sectional plane of Fig. 1 by a line 1—1; and Fig. 3 is a partial plan-view, showing particularly the sealing-device.

The invention is illustrated as embodied in an inclosed electric motor or generator of a well known type, a portion of the armature 5 and the armature-shaft 6 being shown in Fig. 1. The field-magnet comprises a cylindrical portion or field-ring 7, which constitutes also the body of the casing by which the working parts are inclosed. This casing comprises also an end-member 8, which carries the bearings by which one end of the armature-shaft is supported. The end-member 8 is fixed in place by tie-rods 9. The field-magnet is provided with the usual windings 16, inclosed within the field-ring, and these windings, as well as the armature-windings, are connected with the exterior circuits by means of insulated current-leads or cables 10.

The current-leads emerge from the casing through openings 11 near the periphery of the end-member 8, as shown in Fig. 1. Instead of extending directly from the openings, however, the leads are given a sharp reverse bend, so that they extend along the outer surface of the casing toward the opposite end thereof. The leads are protected, where they emerge from the casing, by means of shields, which may be conveniently formed by stamping them from sheet-metal. Each of these shields coöperates, as shown in the drawings, with two of the leads, and comprises a middle portion 12, which is seated flat against the casing, and two lateral channeled portions 13, which form, with the outer surface of the casing, passages within which the current-leads fit closely, as shown in Fig. 1. Each shield is fixed in place by a screw 14, which passes through its middle portion into the end-member 8.

The shields perform several useful functions. In the first place, they hold the leads in their reversely-bent position, and this position is one which conduces to convenience in connecting the leads with other parts of the apparatus with which the machine is associated, for reasons which need not be described herein. In the second place, the shields, in coöperation with the leads, close the openings 11 effectively against the admission of water or dirt. In the third place, the shields protect the leads against injury from accidental blows, particularly in the handling of the machine incidental to its manufacture, shipment, and installation at the point of use. The machine may be laid upon its side and rolled along a floor without injury to the leads at the point where they would otherwise be most exposed to such injury, and at the same time the leads are held parallel with the length of the machine and out of the way.

A further useful feature of the shields resides in the fact that they afford conveient means for sealing the casing of the machine, so that it may not be opened by the user. To this end one of the screws 14 is shown as perforated, so that a seal-wire 15 may be passed through this screw and anchored upon one of the leads. The seal prevents the screw from being turned to permit the removal of the shield, and the stiffness of the leads is such that when bent as is necessary for their passage through the shield they cannot be withdrawn by a direct pull, and therefore it is impossible, so long as the shield remains in place, to remove the end-member 8 from the field-ring, even though the tie-rods be removed.

I claim:—

1. In an electric motor or generator, the combination of a casing with an opening at one end; a current-lead extending outwardly through said opening and thence reversely toward the other end of the casing; and a cap-like shield covering said opening and the reversely-bent part of the current-lead and rigidly but removably fixed to the casing.

2. In an electric motor or generator, the combination of a casing with openings at one end for the emergence of current-leads; and a cap-like shield rigidly but removably fixed to the casing over said openings and having a plurality of channels registering with the respective openings and extending thence toward the opposite end of the casing.

3. In an electric motor or generator, the combination of a casing comprising a field-ring and an end-member, the end-member having an opening, near its periphery, for a current-lead; a current-lead extending, from the inside of the casing, through said opening; and sealable means for retaining the current-lead in a reversely-bent position at said opening, whereby removal of the end-member of the casing is prevented.

EDWARD A. HALBLEIB.